(12) United States Patent
Dering

(10) Patent No.: US 9,081,256 B2
(45) Date of Patent: Jul. 14, 2015

(54) QUICK RELEASE CAMERA MOUNTING DEVICE AND METHODS OF USE

(75) Inventor: Peter Dering, San Francisco, CA (US)

(73) Assignee: Peak Design, LLC, San Francisco, CA (US)

( * ) Notice: Subject to any disclaimer, the term of this patent is extended or adjusted under 35 U.S.C. 154(b) by 312 days.

(21) Appl. No.: 13/496,776

(22) PCT Filed: Jun. 9, 2011

(86) PCT No.: PCT/US2011/001055
§ 371 (c)(1),
(2), (4) Date: Mar. 16, 2012

(87) PCT Pub. No.: WO2011/156004
PCT Pub. Date: Dec. 15, 2011

(65) Prior Publication Data
US 2012/0174382 A1    Jul. 12, 2012

Related U.S. Application Data

(60) Provisional application No. 61/353,123, filed on Jun. 9, 2010, provisional application No. 61/419,155, filed on Dec. 2, 2010.

(51) Int. Cl.
*G03B 17/56* (2006.01)
*G03B 17/02* (2006.01)
(Continued)

(52) U.S. Cl.
CPC .............. *G03B 17/02* (2013.01); *F16M 11/041* (2013.01); *F16M 13/00* (2013.01); *G03B 17/566* (2013.01); *F16M 2200/028* (2013.01); *Y10T 29/49947* (2015.01); *Y10T 403/54* (2015.01)

(58) Field of Classification Search
CPC ............. A45F 5/00; A45F 5/02; A45F 5/021; F16M 11/041; F16M 13/00; F16M 2200/028; A47F 5/0823; B23P 11/00; G03B 17/02; G03B 17/566; Y10T 403/54; Y10T 29/49947

USPC .............. 29/525.01; 24/3.11, 3.12, 522, 526, 24/529, 570, 594.1, 598.1, 598.4; 248/220.1, 220.21, 221.11, 221.12, 248/222.11, 222.41, 223.41, 225.11; 396/425
See application file for complete search history.

(56) References Cited

U.S. PATENT DOCUMENTS 5,014,892 A    5/1991    Copeland
5,540,368 A    7/1996    Oliva
(Continued)

FOREIGN PATENT DOCUMENTS

CN    2479538 Y    2/2002
CN    3352864 S    2/2004
(Continued)

OTHER PUBLICATIONS

Korean Intellectual Property Office; International Search Report and Written Opinion for PCT/US2011/001055; mailed Feb. 17, 2012.
(Continued)

*Primary Examiner* — David Bryant
*Assistant Examiner* — Lee A Holly
(74) *Attorney, Agent, or Firm* — Adams Grumbles, LLP; Brittany Nanzig

(57) ABSTRACT

A camera mounting device and associated method are disclosed. The device can securely affix a camera to a strap of varying properties. The device provides a strap attachment mechanism used to connect the device to a strap such as a belt or a backpack strap. The device also includes a camera attachment mechanism used to attach a camera to the device while allowing its locking and release through a quick release mechanism. The device also includes a lens support extension with a support extension sized and oriented to provide secondary support to a long lens of a camera, such as a lens of a SLR-type camera.

9 Claims, 13 Drawing Sheets

(51) Int. Cl.
*F16M 11/04* (2006.01)
*F16M 13/00* (2006.01)

(56) References Cited

U.S. PATENT DOCUMENTS

| | | | |
|---|---|---|---|
| 6,520,863 B2* | 2/2003 | Porper | 473/35 |
| D621,865 S | 8/2010 | Chidester | |
| 2004/0144815 A1* | 7/2004 | Reid | 224/222 |
| 2005/0072822 A1 | 4/2005 | Stotts | |
| 2008/0013194 A1 | 1/2008 | Dowell | |
| 2008/0237282 A1* | 10/2008 | Sin | 224/197 |
| 2009/0196596 A1* | 8/2009 | Chamberlayne | 396/422 |
| 2010/0005632 A1* | 1/2010 | Pigozzi | 24/3.13 |
| 2010/0133305 A1* | 6/2010 | Stewart | 224/197 |
| 2013/0312233 A1* | 11/2013 | Paik et al. | 24/594.1 |

FOREIGN PATENT DOCUMENTS

| | | |
|---|---|---|
| CN | 300928690 S | 5/2009 |
| CN | 300928691 S | 5/2009 |
| CN | 301112504 S | 1/2010 |
| JP | 2007-33367 S | 7/2008 |
| JP | 2008-6271 S | 2/2009 |
| JP | 2008-6272 S | 2/2009 |
| JP | 2009-9617 S | 5/2010 |
| KR | 20-0252481 Y1 | 11/2001 |
| KR | 10-2010-0048282 A | 5/2010 |
| WO | 2009039292 A1 | 3/2009 |
| WO | 2009109828 A1 | 9/2009 |

OTHER PUBLICATIONS

State Intellectual Property Office of the People'S Republic of China; Evaluation Report of Utility Model Patent for national stage application of PCT/US2011/001055; mailed Dec. 22, 2014.

State Intellectual Property Office of the People'S Republic of China; Evaluation Report of Design Patent ZL201330018179.X; mailed Jan. 8, 2015.

* cited by examiner

QUICK RELEASE CAMERA MOUNTING DEVICE AND METHODS OF USE

TECHNICAL FIELD

The present application relates to a device and methods for securely mounting a camera to a strap. In particular, the present application relates to a device and methods for attaching a camera to a belt or strap that includes a quick release arrangement.

BACKGROUND

Many bags, straps, and various other sorts of carriers exist to transport cameras, specifically digital and analog SLR cameras. However, these devices typically have a number of drawbacks. Some devices do not adequately secure the camera during transport, causing a risk of damage to the camera if it is not stabilized by a user's hand. Other devices firmly secure the camera, but do not allow immediate accessibility, causing users to miss opportunities for photographs of events occurring during the time it takes to disengage the camera from the bag or strap.

For these and other reasons, improvements are desirable.

SUMMARY

In accordance with the following disclosure, the above and other issues are addressed by the following:

In a first aspect, a camera mounting device is disclosed. The camera mounting device includes a chassis having a front surface and a rear surface, the chassis including a hinged connection to a lens support extension. The device includes a buckle arranged on a rear surface of the chassis and configured for connection to a strap of undetermined thickness. The device also includes a shoe mountable to the front surface of the chassis and including a fastener configured to securely fasten the shoe to a camera and a quick release actuator configured to release the shoe from the chassis.

In a second aspect, a method of attaching a camera to a strap is disclosed. The method includes affixing a shoe to a camera using a fastener associated with the shoe, and attaching a chassis of a camera mounting device to a strap using a buckle. The method also includes inserting the shoe into a shoe mounting location in the chassis to affix the shoe and camera to the chassis and strap.

In a further aspect, a camera mounting device is disclosed. The camera mounting device includes a chassis having a front surface and a rear surface. The device also includes a shoe which slides into a designated slot on the chassis. The shoe fastens to any camera utilizing the standard ¼" diameter, 20 threads per inch mount (hereafter referred to as "¼-20" connection). The shoe and camera are locked into the designated slot in the chassis by means of the quick release device. The shoe and camera are released from the device by a user activated button on the side of the chassis.

In yet a further aspect, a method of attaching the device to a strap is disclosed. The method includes a third component of the device called the back plate. A strap of undetermined thickness is sandwiched between the chassis and the back plate. The chassis and the back plate are compressed together by means of two screws located on the horizontal extremities of the chassis and the back plate. The screws go through a clear hole in the chassis and thread into a female threaded receiver on the back plate. The screws are tightened to increase the compressive force between the chassis and the back plate and provided a cinched connection to any strap.

DETAILED DESCRIPTION

Figure 1:
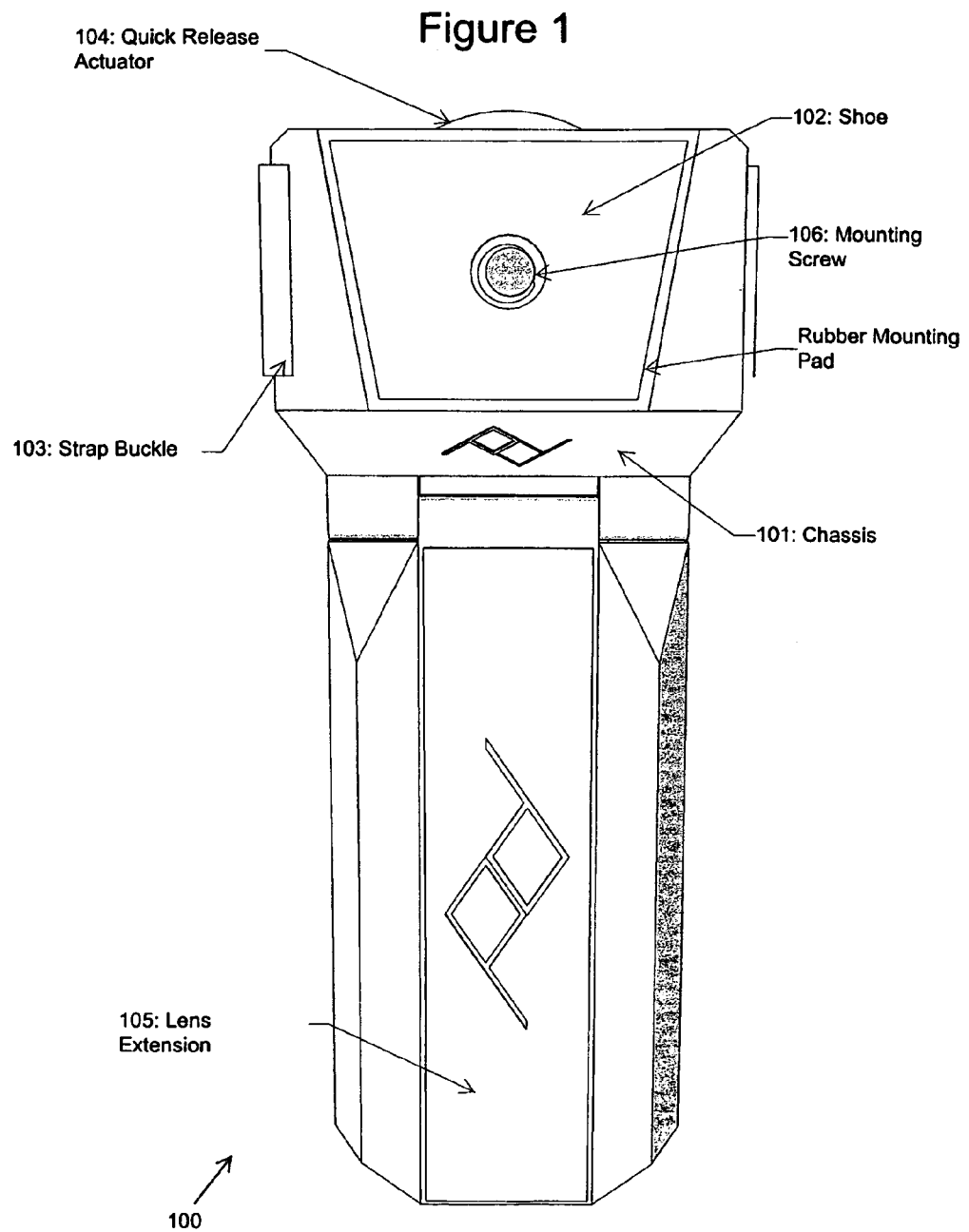
FIG. 1 is a front elevation view of the camera mounting device, according to a possible embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general terms, the present disclosure relates to a camera mounting device, usable primarily for securing cameras to backpack straps, other straps, or belts and utilizing a quick release attachment. Various embodiments of the camera mounting device can include a number of components including a structural chassis to attach to the strap and receive the "shoe", a buckle which securely cinches the chassis to a strap of variable or undetermined thickness, a shoe which screws into the camera and slides into or otherwise engages a corresponding space in the chassis, a quick release mechanism for releasing the shoe from the chassis, and a hinged extension which allows a lens extending from a camera body (such as a lens of a SLR-type camera) to be securely fastened using straps.

FIG. 1 is a front elevation of a camera mounting device 100. The camera mounting device includes a chassis 101 including a camera shoe 102. The chassis 101 has a front major surface to which a camera can be mounted, and a rear major surface that mounts to a strap. In FIG. 1, the chassis 101 is shown with the camera shoe 102 clipped into place. The chassis 101 both accepts the camera shoe 102 at a shoe connection location, as well as securely connects to either a backpack strap or a belt using either a strap buckle 103 or a belt buckle 107 (shown in FIG. 5, described below). A lens support extension 105 attaches to and extends from the chassis 101. The lens support extension 105 has a hinged connection to the chassis 101 provided by a metal pin. This hinged connection allows for movement to accept the curvature of a user's body, and to contour to a user's body.

Figure 9:
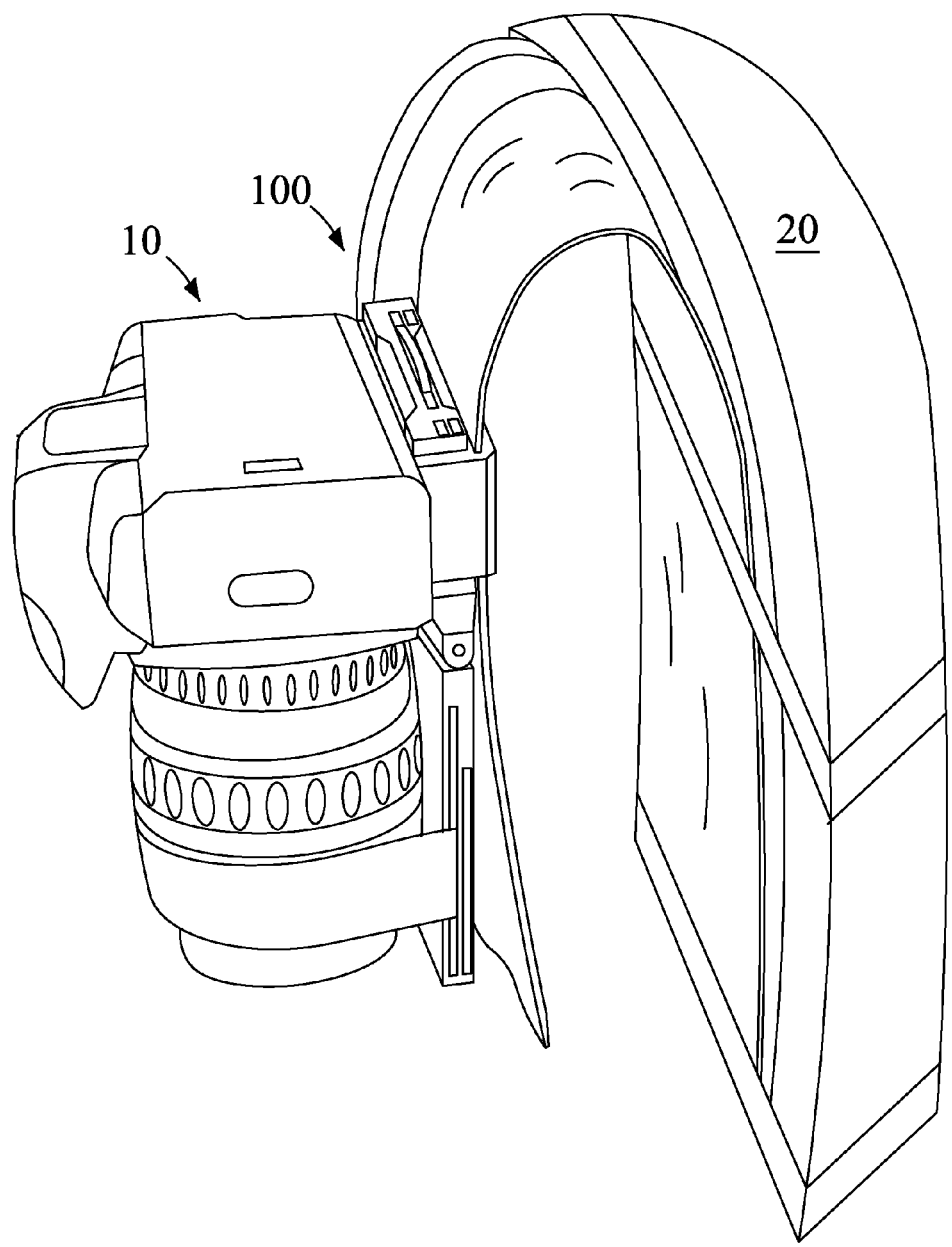
FIG. 9 is a perspective view of a camera mounting device mounted to a backpack strap and holding a camera, according to a possible embodiment of the present disclosure.
Figure 10:
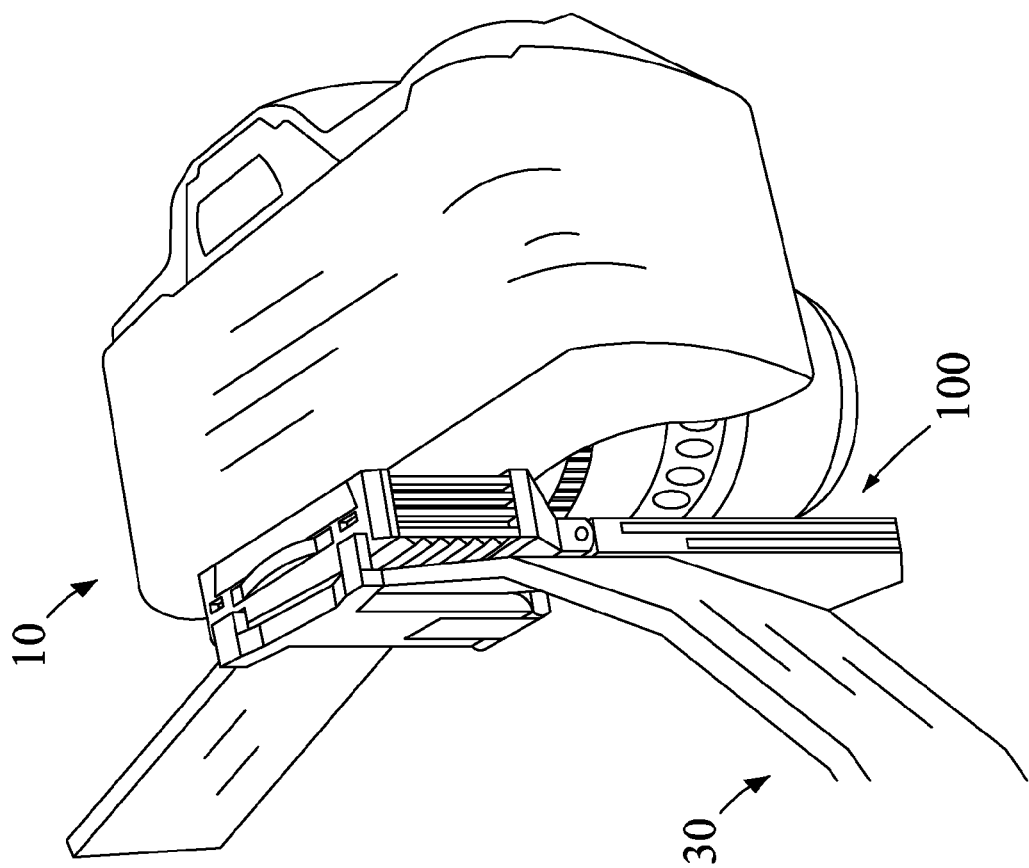
FIG. 10 is a perspective view of a camera mounting device mounted to a belt while holding a camera, according to a possible embodiment of the present disclosure.

A camera (e.g., camera 10 as illustrated in FIGS. 9-10), can be attached to the shoe 102 at a fastener 106, shown as a "¼" mounting screw. Other fasteners could be used as well. In the embodiment shown, the fastener 106 is sized and selected to screw into the bottom of a camera, as is typically found in most tripod systems for cameras. A quick release actuator 104 resides along a top edge of the chassis 101. The quick release actuator 104 is capable of being depressed to allow the shoe 102 to be slid upwards and out of the chassis 101. In the embodiment shown, the quick release actuator 104 and associated shoe 102 is a spring loaded device configured to release the shoe and any camera attached thereto. The quick release actuator 104 can include a retractable spring mechanism capable of ejecting the shoe upon depression of a tab, which causes the shoe and associated camera to quickly separate from the chassis 101, which remains affixed to any strap while the camera is used.

Figure 2:
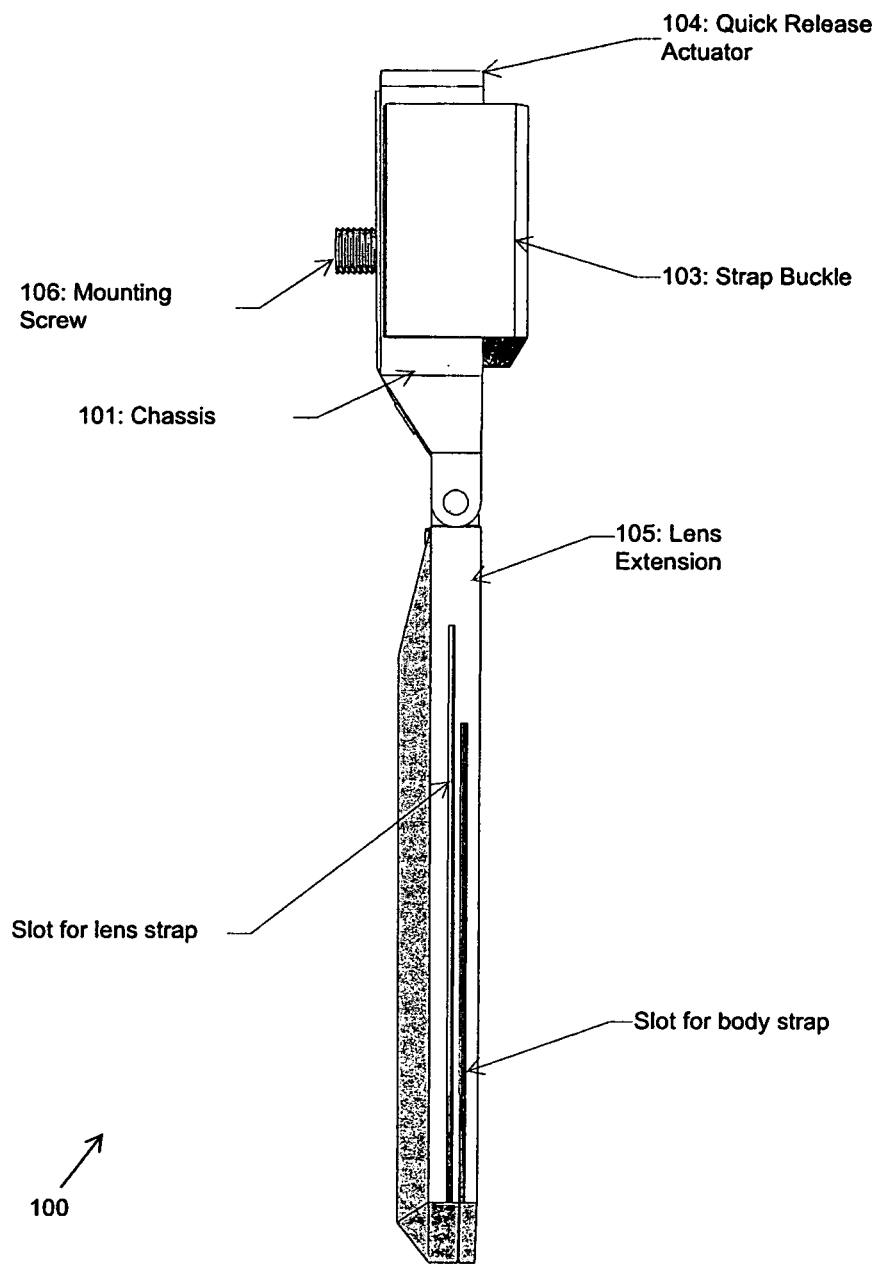
FIG. 2 is a right side elevation view of the camera mounting device of FIG. 1.

FIG. 2 is a side elevation view of the camera mounting device 100. In this view, it can be seen that there are two slots in the lens support extension 105. Each of these slots is designed to hold a strap (e.g., as illustrated in FIG. 9). The strap can take any of a number of forms. In certain embodiments, the strap can include a Velcro connection to wrap around the barrel of a lens. In certain further embodiments, the strap can include an elastic component to allow for some stretching as necessary to firmly encircle a camera lens. The slot for the body strap will function to keep the lens support extension secured to the body. The strap will be able to go completely around the circumference of the user's torso (or leg, in the case of the belt application). This slot is also accessible through the bottom of the lens support extension for the purpose of being able to use a strap on the user's body like a backpack's existing chest strap if the user has a pack with that function.

Figure 3:
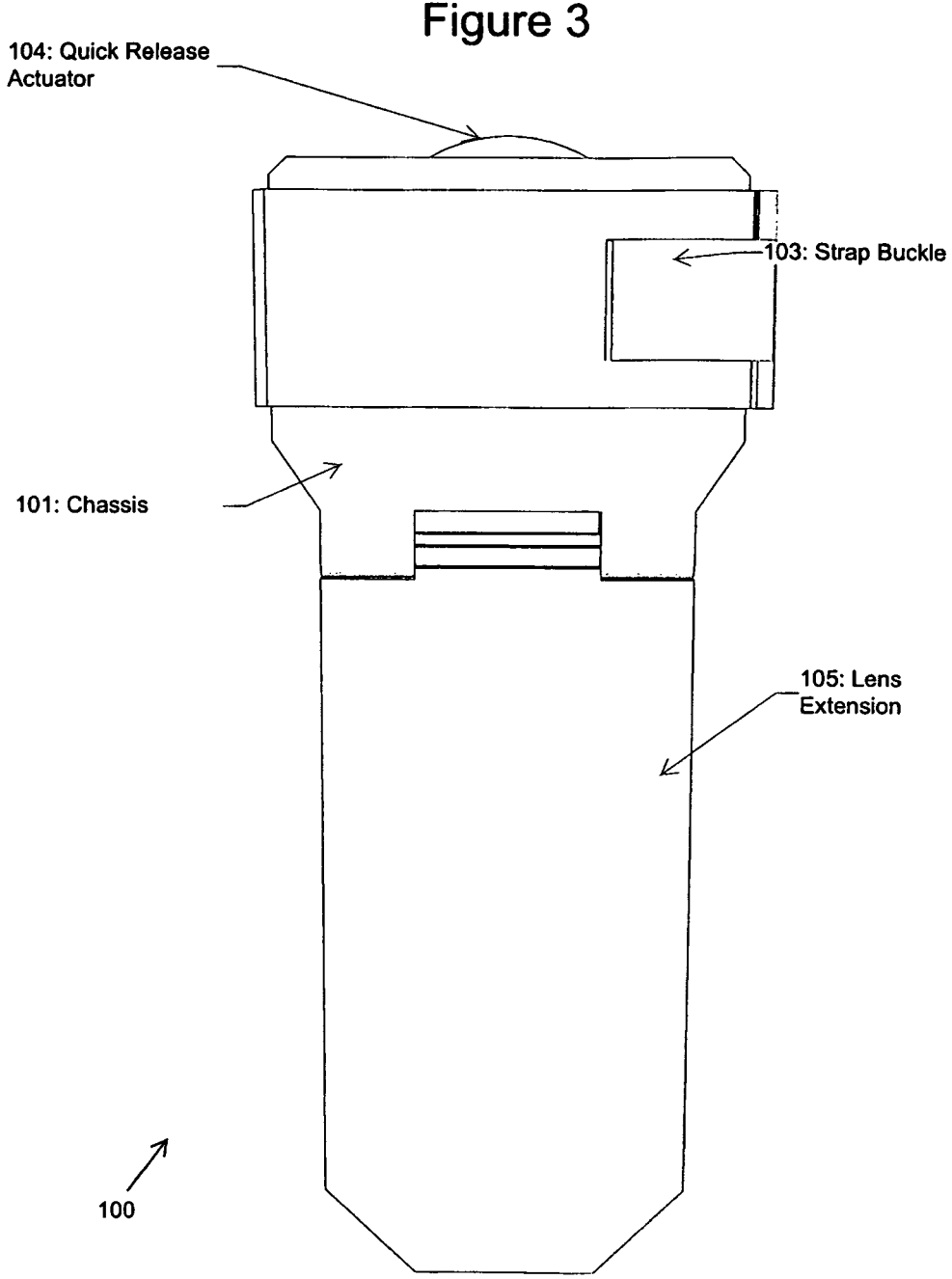
FIG. 3 is rear elevation view of the camera mounting device of the camera mounting device of FIG. 1.

FIG. 3 is a rear elevation view of the camera mounting device 100. As shown in this Figure, on one side of the device 100 the strap buckle 103 can be a rigid piece of aluminum which fits into grooves on the side of the chassis 101. The location where the strap buckle 103 fits into the chassis 101 serves as a hinge point, and the other side of the strap buckle 103 will attach into the side of the chassis 101 via a different set of grooves corresponding to the shape of a clasp on the strap buckle 103. This will allow the strap buckle 103 to cinch a strap between it and the chassis 101.

Figure 4:
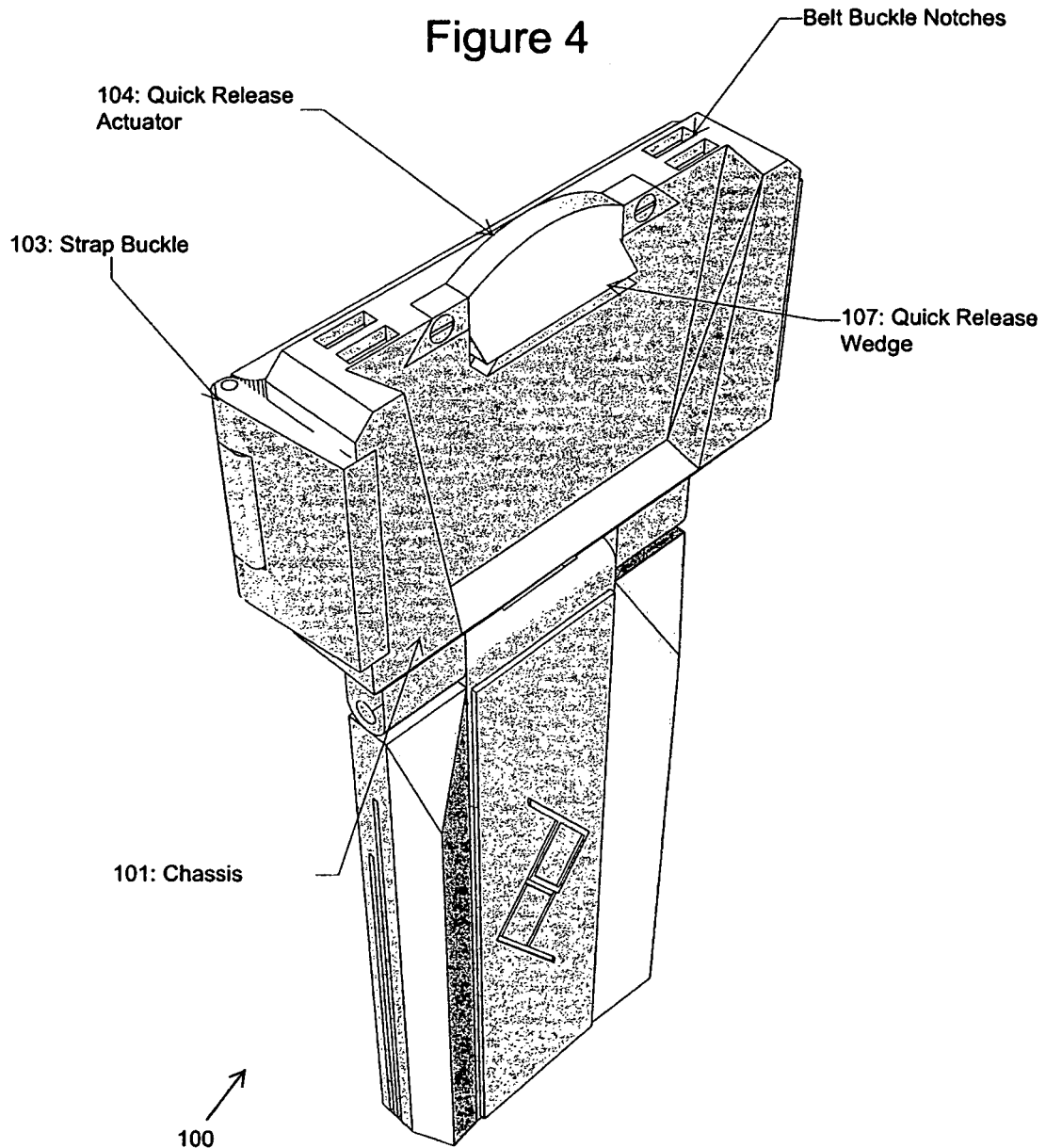
FIG. 4 is an upper right isometric view of the camera mounting device of FIG. 1, with the shoe removed.

FIG. 4 is a perspective isometric view of the camera mounting device 100 with the shoe 102 removed to provide visual access to a quick release wedge 107. The wedge 107 retracts into the chassis 101 when the quick release actuator 104 is depressed.

In the embodiment shown, the wedge 107 retracts automatically when the shoe 102 is inserted into the shoe connection location, due to the inclined plane of the wedge 107. When the shoe 102 is far enough down into the shoe connection location of the chassis 101, a cavity formed in a rear surface of the shoe 102 and corresponding to the shape of the wedge 107 allows the wedge to spring up into the cavity and lock the shoe in place. To remove the shoe, the quick release actuator 104 is depressed, causing the wedge 107 to retract into the chassis 101 and freeing the shoe 102. In certain embodiments, a compression spring beneath the center of the wedge 107 biases the wedge into an engaged position to prevent the wedge from accidentally disengaging from the shoe 102.

Figure 5:
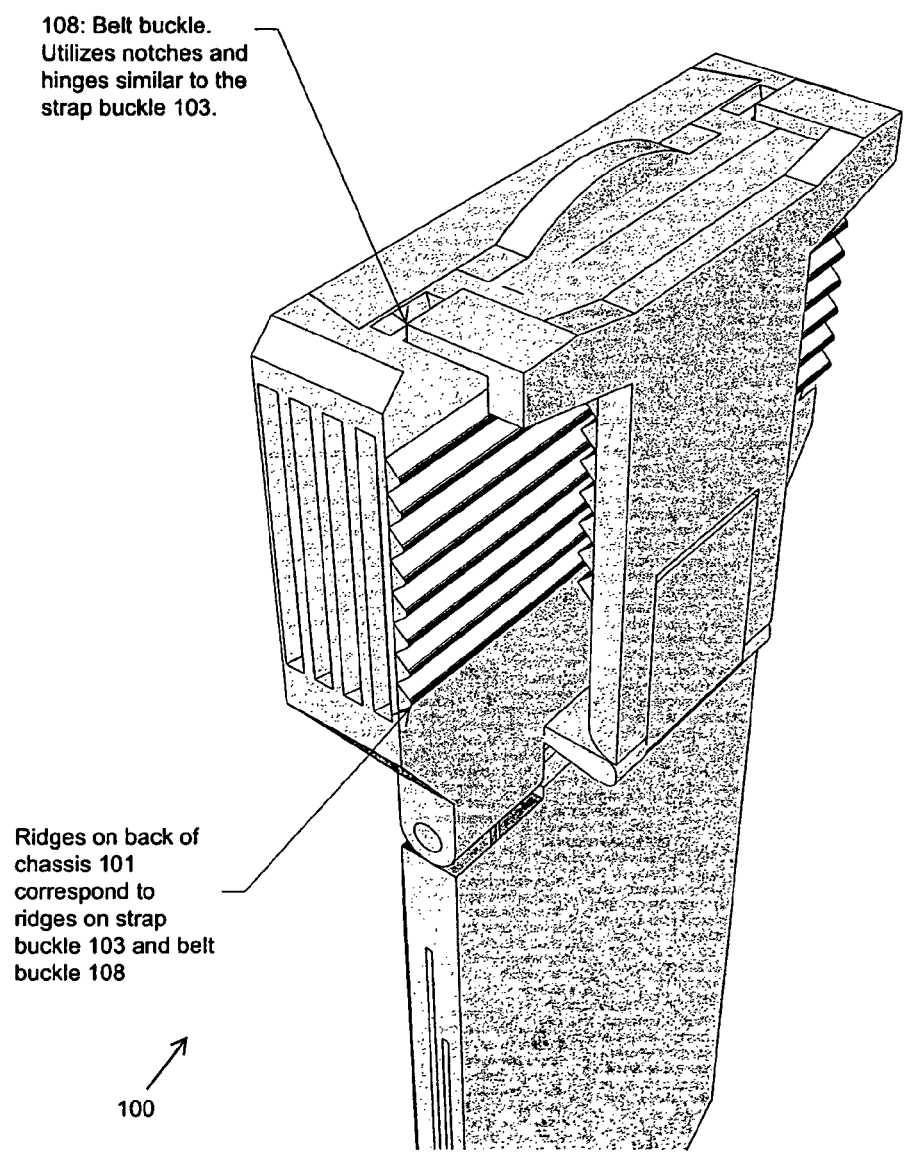
FIG. 5 is a rear isometric perspective view of the camera mounting device of FIG. 1 with the strap buckling device removed.

FIG. 5 provides a rear isometric view of the camera mounting device 100. In place of the strap buckle 103 of FIG. 3 is the belt buckle 108. The belt buckle 108 allows for the present embodiment to be affixed to a horizontal strap (such as a belt, as in FIG. 10) as opposed to a vertical strap (such as a backpack strap as in FIG. 9). The belt buckle 108 is to be used in lieu of the strap buckle 103; they are not to be used together. FIG. 5 also illustrates ridges on the rear of the chassis 101 which correspond to similar ridges on the strap buckle 103 and the belt buckle 108.

Figure 6:
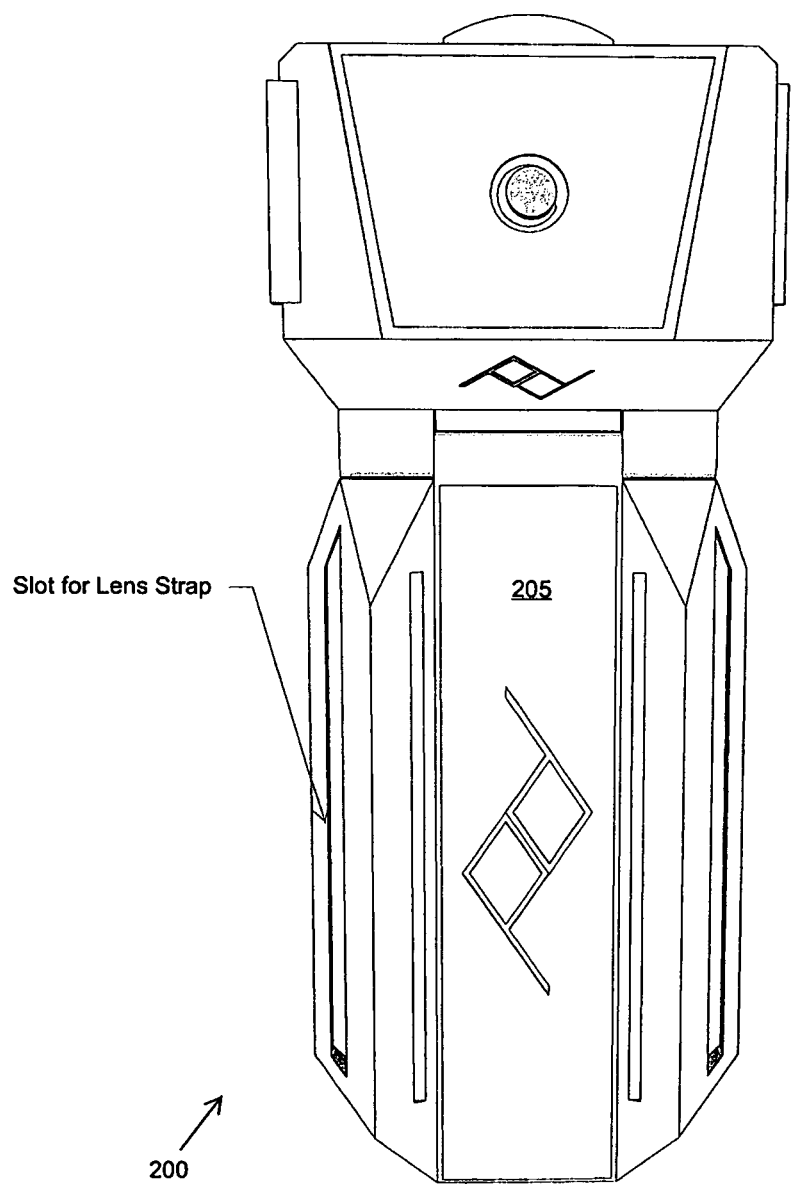
FIG. 6 is a front elevation view of a camera mounting device according to a further possible embodiment of the present disclosure.
Figure 7:
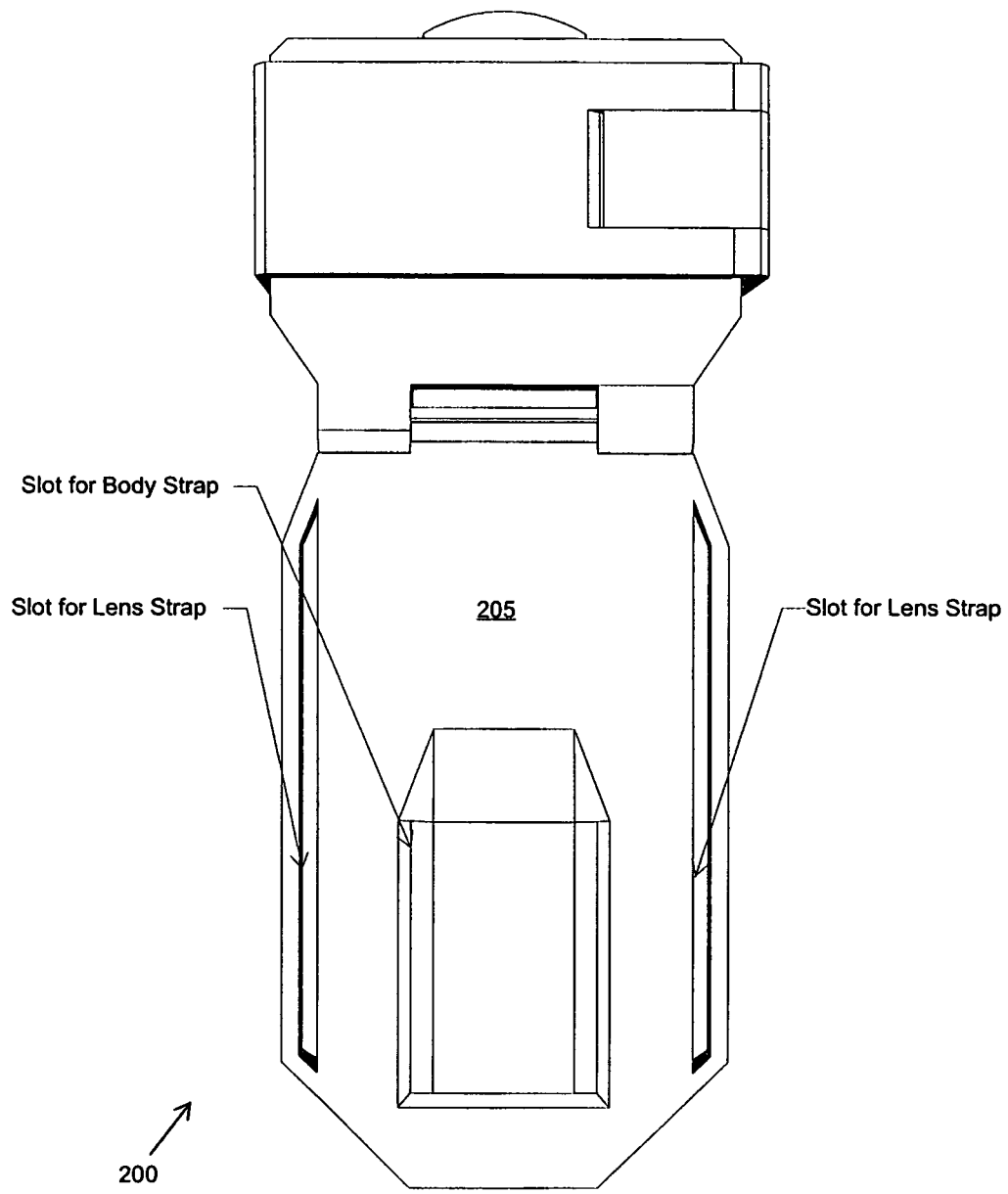
FIG. 7 is a rear elevation view of the camera mounting device of FIG. 6.
Figure 8:
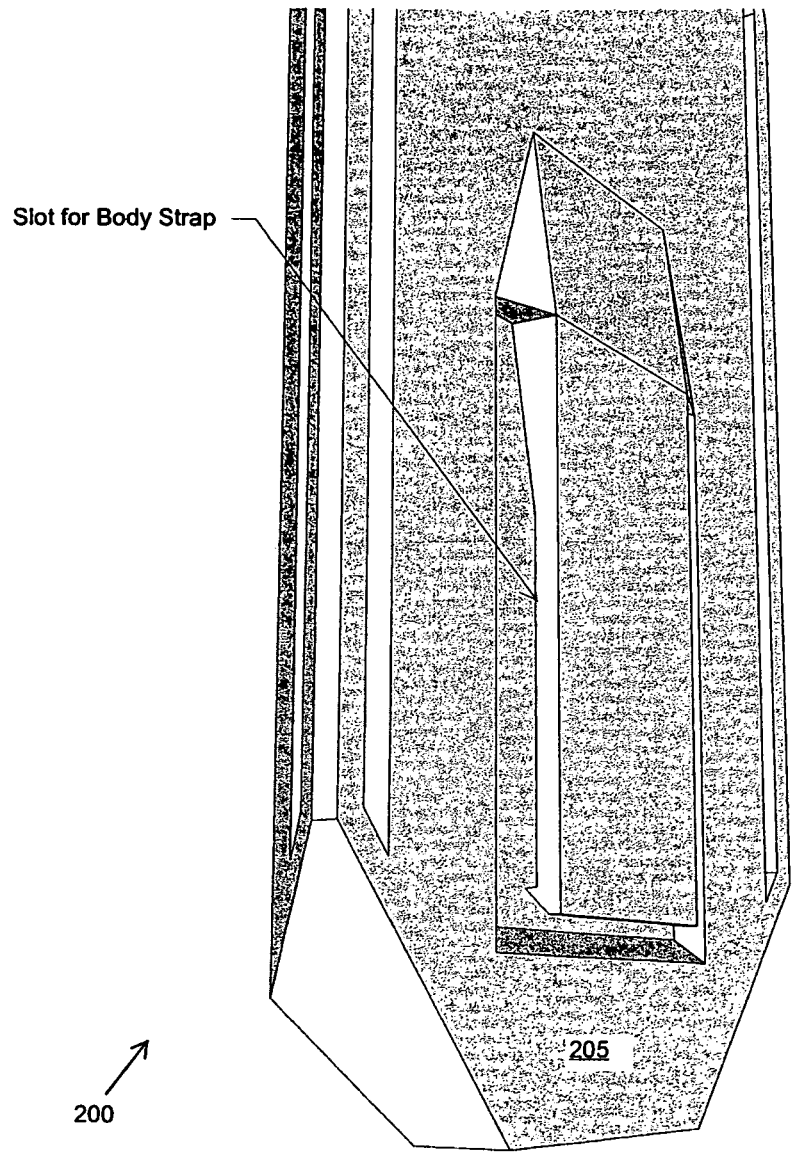
FIG. 8 is a partial isometric view of a lens support extension of the camera mounting device of FIG. 6.

FIGS. 6-8 illustrate a camera mounting device 200 according to a further possible embodiment of the present disclosure. The camera mounting device 200 generally includes analogous features to the device 100 of FIGS. 1-5, but has a different lens support extension 205, in place of lens support extension 105 illustrated in the above figures. Lens support extension 205 has formed therein a pair of slots sized to receive one or more straps configured to encircle the lens of a camera and connect it to the extension 205. As best illustrated in FIGS. 7-8, a separate slot arrangement is included on a rear side of the lens support extension 205, for connecting a further support band around a body part of a user (e.g., a leg in the case the mounting device 200 is attached to a belt, or a user's torso if the mounting device is attached to a backpack strap).

FIG. 9 graphically demonstrates how a camera mounting device, such as device 100 will mount to a backpack strap. In this embodiment, a camera mounting device 100 connects to a strap of a backpack 20 via a strap buckle 103 as illustrated in FIG. 3 to mount a camera 10 in a vertically aligned orientation, with the camera lens oriented downward. In alternative embodiments, other camera orientations are possible as well.

FIG. 10 graphically demonstrates how a camera mounting device, such as device 100 will mount to a belt. In this embodiment, the camera mounting device 100 connects to a belt 30 via belt buckle 108, as illustrated in FIG. 5, to mount the camera 10 in a vertically aligned orientation and with the camera lens oriented downward. As with the arrangement of FIG. 6, alternative camera orientations are possible as well. For example, in certain embodiments, the camera orientation is adjustable (e.g., the vertical rotational position of the camera can be adjusted).

Although in FIGS. 9-10 camera mounting device 100 is illustrated, it is understood that additional embodiments are contemplated as having analogous attachment features, such as those shown in FIGS. 6-8 relating to camera mounting device 200.

Overall, it can be seen that the camera mounting device can be used to fasten a camera to a backpack or belt, allowing it to be securely maintained while allowing its user to quickly release the camera from the strap (using the quick release actuator 104) for access.

Figure 11:
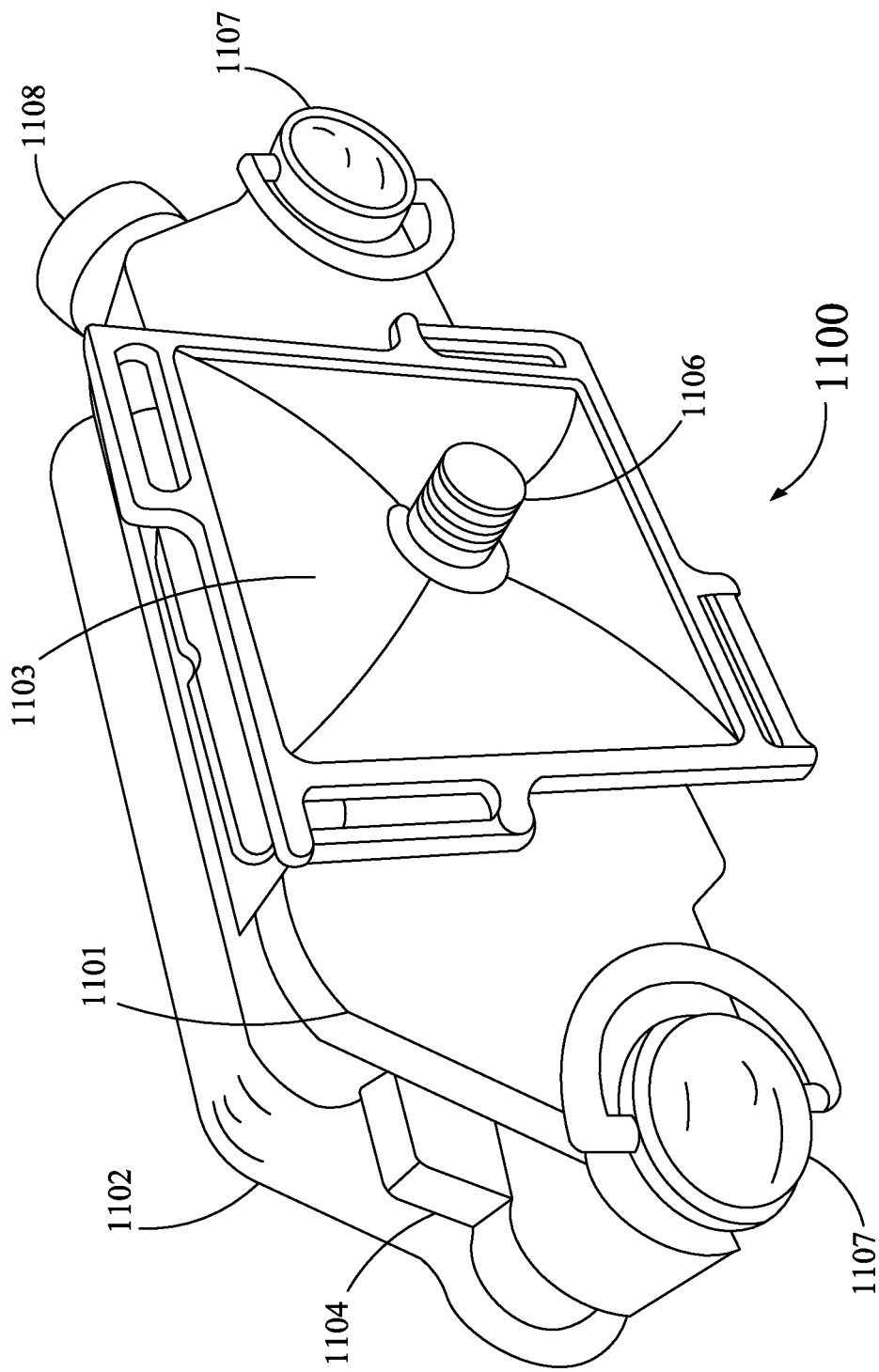
FIG. 11 is an upper right isometric of the camera mounting device, according to a possible embodiment of the present disclosure.

FIG. 11 is an upper right isometric view of a camera mounting device 1100 showing all of the functional parts of the device. The components of the camera mounting device include a chassis 1101, a backplate 1102, a camera shoe 1103, a spring loaded quick release button 1104, a camera mounting screw 1106, two cinching screws 1107, and a secondary locking screw 1108.

Figure 12:
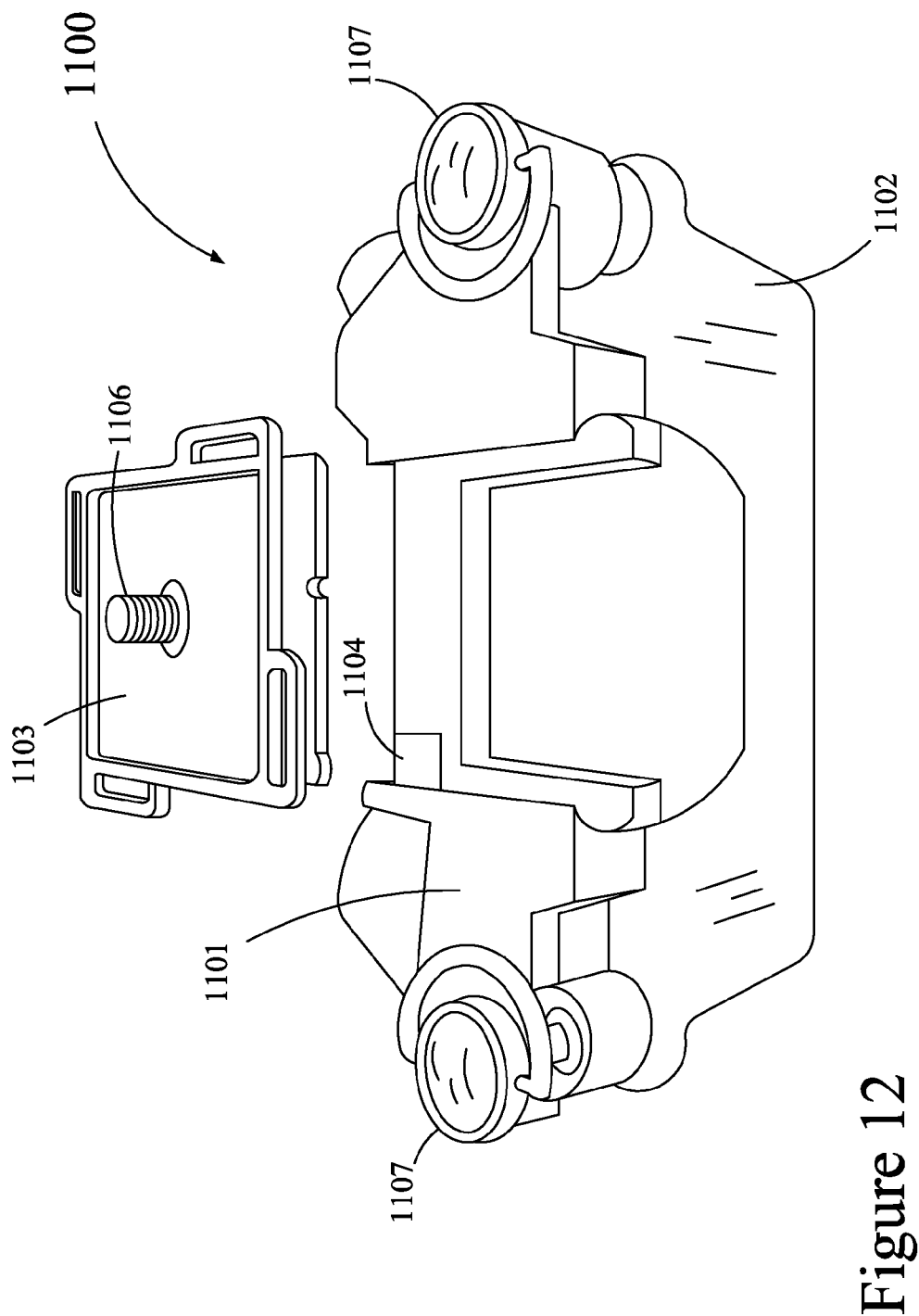
FIG. 12 is a bottom isometric view of the camera mounting device of FIG. 11 with the shoe removed and its path of travel into the chassis shown.

FIG. 12 is a bottom isometric view of the camera mounting device. FIG. 12 depicts the same components listed in FIG. 11, yet the shoe 1103 has been slid out of the chassis 1101.

Figure 13:
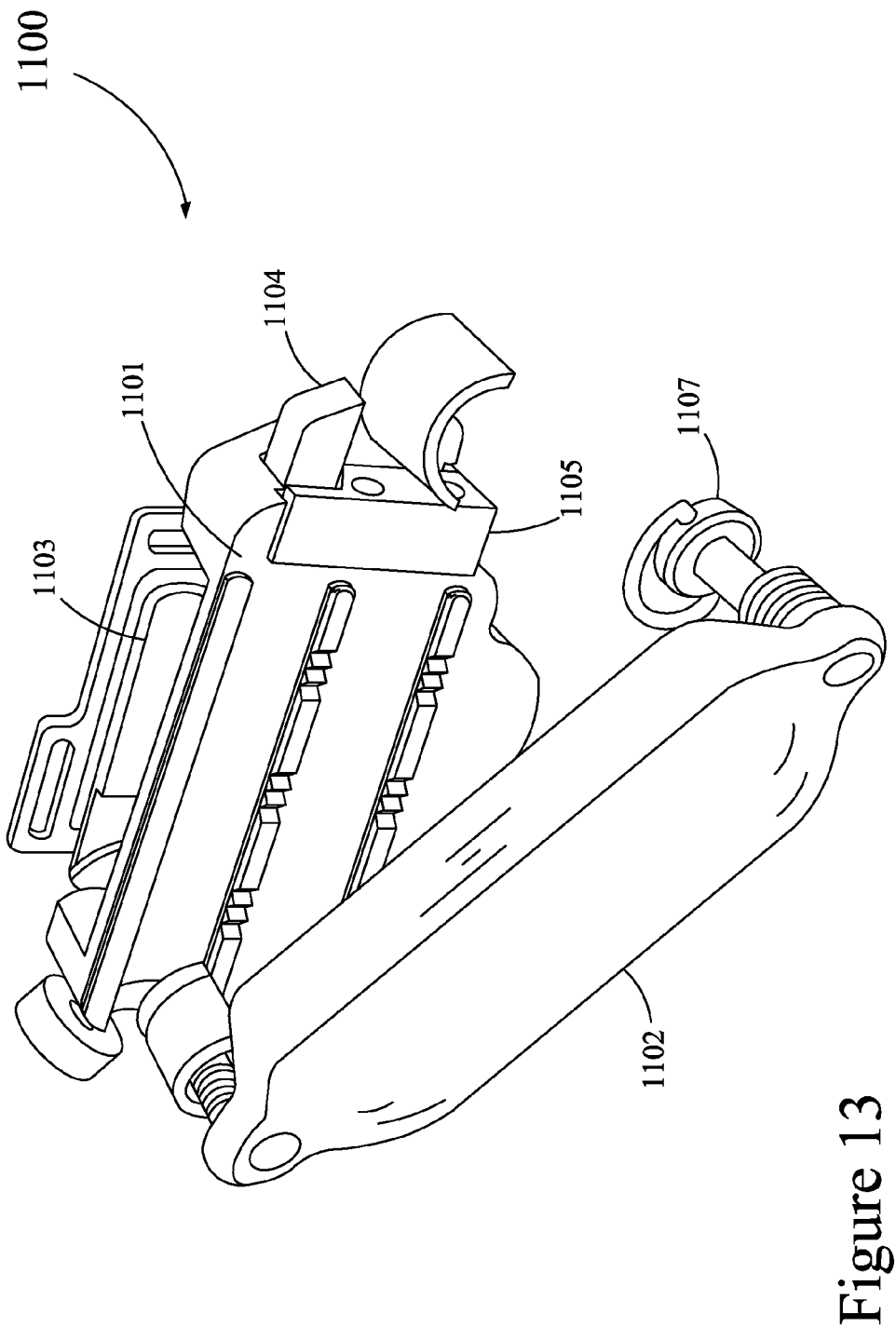
FIG. 13 is a rear isometric view of the camera mounting device of FIG. 11.

FIG. 13 is a rear isometric view of the camera mounting device 1100 intended to show how the backplate 1102 and the chassis 1101 separate so that a strap can be inserted. FIG. 13 also shows a quick release button cover 1105.

A camera can be mounted to the shoe 1103 by threading the camera connection screw into the tripod receiver on the bottom of most cameras. This connection is obtained by using the standard "¼" diameter-20 thread per inch screw found on the bottom of most cameras. Other fasteners could be used as well. In the embodiment shown, the camera connection screw 1106 is sized and selected to screw into the bottom of a camera, as is typically found in most tripod systems for cameras. This is shown on both FIGS. 11 and 12.

Separately from the shoe, the rest of the components of the camera mounting device 1100 are mountable to any strap, horizontal or vertical. This is accomplished by sandwiching the strap between the chassis 1101 and the backplate 1102, and tightening the cinching screws until the device is securely affixed to the strap. Gripping of any given strap is aided by the offset ridges which are on the backplate 1102 and the chassis 1101. In order to get the strap between the chassis 1101 and the backplate 1102, one of two methods can be employed. One method involves completely unscrewing both cinching screws from the backplate 1102 and then screwing them back in when the backplate 1102 has been correctly placed between the chassis 1101 and the backplate 1102. The other more common method of attaching the device 1100 to a strap is to unscrew the left cinching screw 1102 as depicted in FIGS. 11 and 12 enough turns to make the surface of the cinching screw 1107 head rise above the lip of its cutaway in the chassis 1101. When the left cinching screw 1107 is sufficiently elevated, the chassis 1101 can be swiveled and separated from the backplate, with the pivot point being the right cinching screw 1107 as depicted in FIGS. 11 and 12. Once the chassis 1101 is out of the way, the strap can be positioned in front of the backplate 1102 and the chassis 1101 can be swiveled back into place and cinched onto the strap with both cinching screws 1107.

Once the camera mounting device 1100 is mounted to the strap and the shoe 1103 is mounted to the camera, the device is ready for use and the user can now mount his or her camera to their device. This is accomplished by sliding the shoe 1103 (with camera attached) into the corresponding slot on the chassis 1101. FIG. 12 shows the shoe 1103 (without camera attached) just above this slot. Upon entrance of the shoe 1103 into the slot in the chassis 1101, the spring loaded quick release button 1104 will be knocked out of the way by the interaction of its inclined face being contacted by a rounded feature on the bottom of the shoe intended to knock the quick release button out of the way. When the shoe 1103 has fully entered the slot on the chassis 1101, a corresponding cutout on the bottom of the shoe 1103 allows the quick release button 1104 to slide back to its original position. This action locks the shoe 1103 into place, and prevents the shoe 1103 (and the attached camera) from being removed from the chassis 1101. The shoe 1103 is removed from the chassis 1101 by the user depressing the spring loaded quick release button 1104 until it is unobstructed by the corresponding cutout on the bottom of the shoe 1103, and the shoe 1103 can be removed from the device. This spring loaded locking mechanism could be accomplished by many configurations of spring mechanisms. The present disclosure depicts only one possible embodiment of the spring loaded locking mechanism.

A secondary locking screw 1108 has been included and functions as follows. When the shoe 1103 is engaged with the chassis 1101 and locked into place, the secondary locking screw 1108 can be turned clockwise so that it protrudes into the shoe 1103. The shoe 1103 has a small notch cut in it to receive the shape of the secondary locking screw 1108. The secondary locking screw 1108 is an additional measure to prevent the shoe 1103 from being removed from the chassis 1101. To disengage the secondary locking screw 1108, it is simply turned counterclockwise far enough to remove it from the slot in the chassis 1101 where it resides within the body of the chassis 1101.

The camera mounting device also includes additional features aside from the main purpose of mounting a camera to a strap. In both FIGS. 11 and 12 it is evident that the shoe 1103 has four slots protruding from its sides. The first purpose for one of these slots is to attach to a camera strap (such as that similarly found on a camcorder). The second purpose is to enable the shoe 1103 to be tethered to the chassis 1101. This would be accomplished by connecting the bottom slot on the shoe 1103 through the slot in the chassis 1101.

Although certain attachment systems are described herein, it is understood that any method of attaching a camera carrying device to a strap by means of cinching and/or compression (be it buckles, screws, etc.) are encompassed. Furthermore, other locking devices could be used, such as a screw turned and inserted into a groove in the shoe which prevents the shoe from being ejected.

It will be apparent to those skilled in the art that various modifications or variations may be made in the present disclosure without departing from the scope or spirit of the invention. Other embodiments of the disclosure will be apparent to those skilled in the art from consideration of the specification and practice of the invention disclosed herein.

The above specification, examples and data provide a complete description of the manufacture and use of the composition of the invention. Since many embodiments can be made without departing from the spirit and scope of the invention, the invention resides in the claims hereinafter appended.

The invention claimed is:
1. A camera mounting device comprising:
a chassis having a front surface and a rear surface;
a back plate having a substantially flat front surface and a substantially flat rear surface;
at least two cinching screws adjustably connecting the back plate to the chassis, wherein:
  a first cinching screw is connectable to a right side of the substantially flat rear surface of the back plate and a second cinching screw is connectable to a left side of the substantially flat rear surface of the back plate;
  a space between the back plate and the chassis fits a strap or belt of undetermined thickness;
  the first and second cinching screws, when rotated in a direction that causes the chassis and back plate to move closer together, cause the chassis and back plate to compress the strap or belt between the chassis and the back plate; and
  when both cinching screws are loosened, the back plate swivels around the first cinching screw and releases at the second cinching screw;
a slot in the front surface of the chassis for receiving a shoe that is slidably and releasably connected to the chassis;
a fastener connected to the shoe that is configured to secure the shoe to a camera; and
a spring-loaded quick release actuator configured to lock and release the shoe from the chassis.

2. The camera mounting device of claim 1, wherein the fastener includes a screw sized to be received into a tripod connector of a camera.

3. The camera mounting device of claim 1, wherein the device attaches to a vertical strap or belt.

4. The camera mounting device of claim 1, wherein the device is substantially rectangular.

5. The camera mounting device of claim 1, wherein at least a portion of the back plate is substantially the same shape, width, and length as the chassis.

6. The camera mounting device of claim 1, wherein the cinching screws are fully removable from the back plate.

7. The camera mounting device of claim 1, wherein when both cinching screws are loosened, the back plate swivels around the second cinching screw instead of the first cinching screw and releases at the first cinching screw instead of the second cinching screw.

8. The camera mounting device of claim 1, further comprising a lock configured to lock the shoe into the chassis.

9. The camera mounting device of claim 1, wherein the front surface of the back plate and the back surface of the chassis have offset ridges.

\* \* \* \* \*

UNITED STATES PATENT AND TRADEMARK OFFICE
CERTIFICATE OF CORRECTION

Page 1 of 3

PATENT NO. : 9,081,256 B2
APPLICATION NO. : 13/496776
DATED : July 14, 2015
INVENTOR(S) : Peter Dering It is certified that error appears in the above-identified patent and that said Letters Patent is hereby corrected as shown below:

In the specification:

Column 2, line 2 should read as follows:
--...plate and to provide a cinched...--

Column 2, line 57 should read as follows:
--... a buckle that securely cinches...--

Column 2, line 58 should read as follows:
--...thickness, a shoe that screws...--

Column 2, line 62 should read as follows:
--...that allows a lens extending from...--

Column 2, line 65 should read as follows:
--...a front elevation view of a camera...--

Column 3, line 5 should read as follows:
--... location as well as securely connects...--

Column 3, line 12 should read as follows:
--...user's body and to contour to a...--

Column 3, lines 44-45 should read as follows:
--...user's body, like a backpack's existing chest strap, if the user...--

Column 3, lines 49-50 should read as follows:
--...aluminum that fits into grooves...--

Signed and Sealed this
Seventeenth Day of May, 2016

Michelle K. Lee
*Director of the United States Patent and Trademark Office*

CERTIFICATE OF CORRECTION (continued)
U.S. Pat. No. 9,081,256 B2

In the specification:

Column 4, line 2 should read as follows:
--...the shoe 102 in place. To remove the shoe 102, the...--

Column 4, lines 6-7 should read as follows:
--...the wedge 107 into an engaged position to prevent the wedge 107 from...--

Column 4, lines 13-14 should read as follows:
--...strap (such as a belt 30, as in...--

Column 4, line 15 should read as follows:
--...pack strap 20 as in FIG. 9).--

Column 4, lines 17-18 should read as follows:
--...chassis 101 that correspond to similar...--

Column 4, line 24 should read as follows:
--...support extension 205 in place of...--

Column 4, line 32 should read as follows:
--...attached to a belt 30, or a user's...--

Column 4, line 33 should read as follows:
--...attached to a backpack strap 20).--

Column 4, line 35 should read as follows:
--...device 100, will mount to a backpack strap 20.--

Column 4, lines 37-38 should read as follows:
--...strap buckle 103 to mount a camera 10...--

Column 4, lines 38-39 should read as follows:
--...aligned orientation with the camera...--

Column 4, line 42 should read as follows:
--...device 100, will mount to a belt 30.--

Column 4, line 44 should read as follows:
--...via belt buckle 108 to mount...--

Column 5, lines 21-22 should read as follows:
--...backplate 1102 and tightening the...--

CERTIFICATE OF CORRECTION (continued)
U.S. Pat. No. 9,081,256 B2

In the specification:

Column 5, line 24 should read as follows:
--...offset ridges that are on the backplate...--

Column 5, line 29 should read as follows:
--...when the strap has been correctly...--

Column 5, lines 32-33 should read as follows:
--...cinching screw 1107 enough turns to...--

Column 5, line 37 should read as follows:
--...from the backplate 1102 with the pivot...--

Column 5, line 38 should read as follows:
--...screw 1107, as depicted in FIG. 13. Once...--

Column 5, line 40 should read as follows:
--...of the backplate 1102, and the chassis 1101...--

Column 5, line 46 should read as follows:
--...to the device. This is accomplished...--

Column 5, line 52 should read as follows:
--...inclined face with a rounded...--

Column 5, lines 53-54 should read as follows:
--...the shoe 1103 intended to knock the quick release button 1104 out...--

Column 5, line 58 should read as follows:
--...shoe 1103 into place and prevents...--

Column 5, line 63 should read as follows:
--...shoe 1103 and removing the shoe 1103 from...--

Column 6, line 11 should read as follows:
--...chassis 1101 that resides within...--

Column 6, line 23 should read as follows:
--...that any methods of attaching a camera...--

Column 6, line 27 should read as follows:
--...a groove in the shoe, which prevents...--